April 24, 1956  S. LONDON  2,743,406
ALTERNATING CURRENT MOTOR CIRCUIT
Filed March 29, 1955
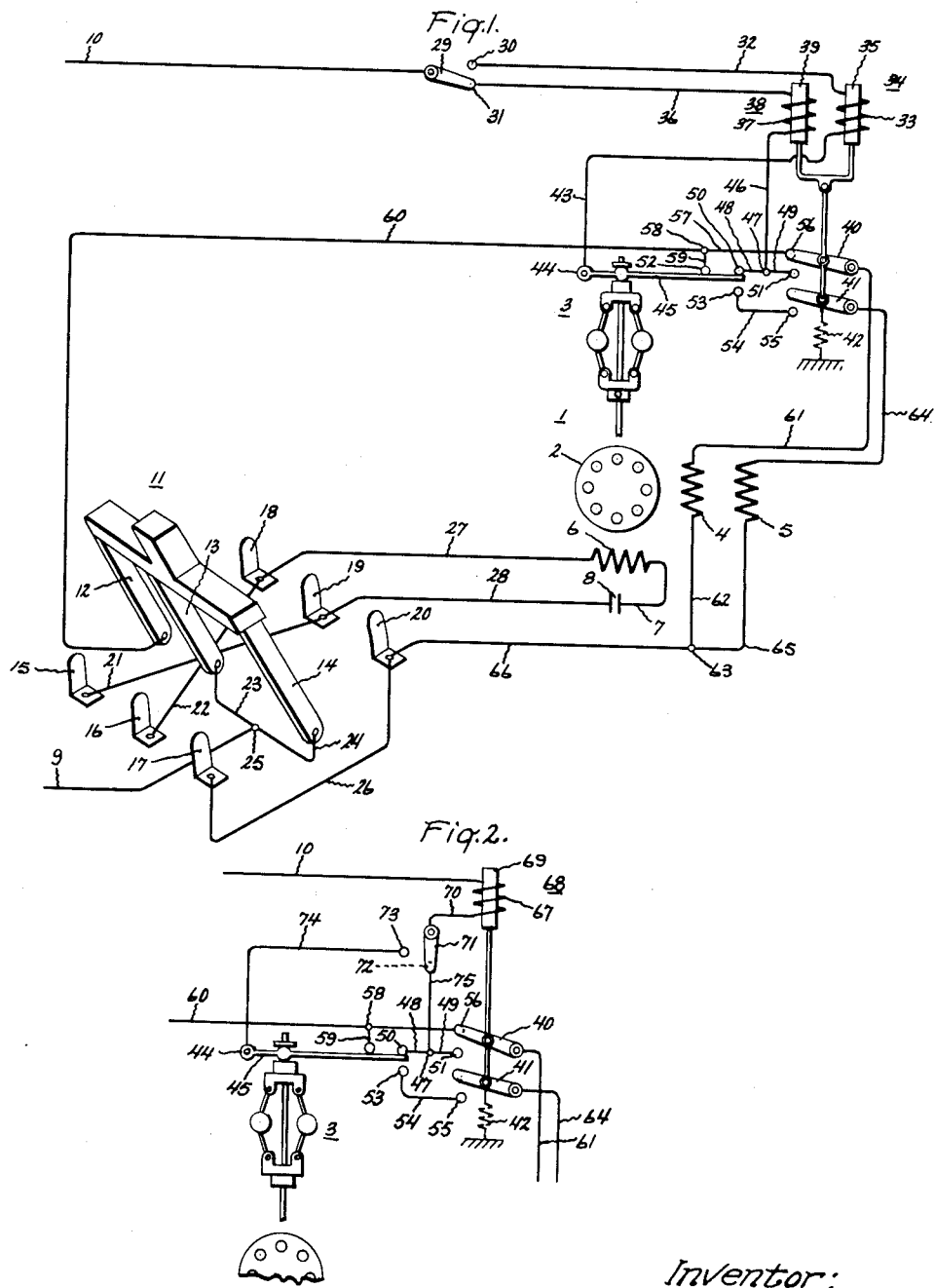
Inventor:
Sol London,
by [signature]
His Attorney.

United States Patent Office 2,743,406
Patented Apr. 24, 1956

2,743,406

ALTERNATING CURRENT MOTOR CIRCUIT

Sol London, Fort Wayne, Ind., assignor to General Electric Company, a corporation of New York Application March 29, 1955, Serial No. 497,588

4 Claims. (Cl. 318—203)

This invention relates to dynamoelectric machines, and more particularly to a two-speed reversing self-starting single phase alternating current motor.

The increasing complexity of apparatus designed to be operated by electric motors makes it desirable to provide motors which not only are capable of rapid reversal, but can also operate at different speeds, with reversal being possible at all speeds.

It is therefore, an object of this invention to provide an improved electric motor circuit which will incorporate the desirable features set forth above.

Further objects and advantages of this invention will become apparent and the invention will be better understood by reference to the following description and the accompanying drawing, and the features of novelty which characterize this invention will be pointed out with particularity in the claims annexed to and forming a part of this specification.

In its broadest aspect, this invention provides a multi-speed, reversing, self-starting alternating current single phase motor which includes main windings which are alternatively selectable for operation, each main winding being arranged to provide a particular speed of operation. A starting winding is provided and is axially displaced from and electrically in parallel with one of the main windings. The motor is connected so that it will always start on the one main winding and the starting winding. Speed responsive switch means are provided and are arranged so as to disconnect the starting winding at a predetermined speed, after which the motor will run on the selected one of the main windings. In addition, switch means are provided for reversing the connections of the starting winding so as to cause rotation of the motor in the opposite direction. Relay means are connected to be energized during starting and running of the motor and to be de-energized upon operation of the reversing switch means from one operative position to another so long as none of the windings are connected for operation. The relay means are effective when de-energized to connect the one main winding and the starting winding in a regenerative braking circuit, provided the reversing switch means is closed. By this means, the motor is braked rapidly until the starting winding cuts back in; from that point, it is plugged to a stop and caused to rotate in the opposite direction.

In the drawing,

Figure 1 is a schematic diagram of the improved motor circuit of this invention; and Figure 2 is a fragmentary schematic diagram of a second embodiment of the invention.

Referring now to Figure 1 of the drawing, there is shown a single phase alternating current motor of the induction type, generally indicated at 1, having a squirrel-cage-type rotor 2. A speed responsive device, such as the centrifugal mechanism generally indicated at 3, is responsive to the speed of rotation of rotor 2. Motor 1 is further provided with a low speed main winding 4, a high speed main winding 5, and a low speed starting winding 6 which is connected by a line 7 in series with a phase displacing member, such as capacitor 8. The motor is connected across a source of 60 cycle 110 volt alternating current power by a pair of lines 9 and 10. A triple-pole double-throw switch, generally indicated at 11, is provided with three contact arms 12, 13, and 14, which are respectively engageable with contacts 15, 16, and 17 when the switch is thrown to the left, and with contacts 18, 19, and 20 when the switch is thrown to the right. Terminals 15 and 19 are connected together by a line 21, terminals 16 and 18 are connected together by a line 22, and contact arms 13 and 14 are respectively connected to line 9 by lines 23 and 24 which join each other and line 9 at point 25. Contacts 17 and 20 are connected together by a line 26.

A line 27 connects contact 18 to starting winding 6 and a line 28 connects contact 19 to capacitor 8, so that in effect starting winding 6 is connected across contacts 18 and 19. It will be seen that by this arrangement the connections to the starting winding 6 are actually reversible, depending upon whether contact arms 12 and 13 are in engagement respectively with contacts 15 and 16 or 18 and 19.

Line 10 terminates in a single-pole double-throw switch arm 29 engageable with either of two contacts 30 and 31. Contact 30 is connected to a line 32 which is joined to a coil 33 of a relay 34 having a core 35. In similar fashion, contact 31 is connected to a line 36 which is joined to a coil 37 of a relay 38 having a core 39. Relays 34 and 38 each are capable of controlling the movement of a pair of contact arms 40 and 41 which are normally biased to the position shown in the Figure 1, as indicated by spring 42 acting against the contact arms 40 and 41. Coil 33 is connected to a line 43 which is joined at 44 to a contact arm 45 whose position is controlled by centrifugal mechanism 3. Coil 37 is connected to a line 46 which in turn is joined at point 47 to a pair of lines 48 and 49 which terminate respectively in contacts 50 and 51. Contact 50 and another contact 52 are both engageable by contact arm 45 when rotor 2 is either stationary or is rotating below the predetermined speed level. When the predetermined speed is attained, the mechanism 3 will move contact arm 45 to engage a stationary contact 53 which is connected by a line 54 to a contact 55. Contact 55 is engageable by contact arm 41 when either of relays 34 and 38 is energized, and, at the same time, contact arm 40 is arranged to engage contact 51. In the unenergized position of the arms 40 and 41, the prior of them engages a contact 56 while the latter is out of engagement with any contact. Contact 56 is connected through a line 57 to point 58. A line 59 connects point 58 to stationary contact 52, and a line 60 connects point 58 to contact arm 12 of switch 11.

Contact arm 40 is connected through a line 61 to the low speed main winding 4, which in turn is connected through line 62 to point 63. Contact arm 41 is connected through a line 64 to the high speed main winding 5 which is in turn connected through a line 65 to point 63. A line 66 connects point 63 to contact 20 of switch 11.

The operation of motor 1 will now be explained, assuming that switch 29 is connected to contact 31, as shown in Figure 1, and that switch 11 is thrown to the left so that contact arms 12, 13, and 14 respectively engage contacts 15, 16, and 17. A circuit will then be established, starting from contact 31, through line 36, relay coil 37, line 46, line 48, contact arm 45, line 59, line 57, contact 56, contact arm 40, line 61, low speed main winding 4, line 62, line 66, contact 20, line 26, contact 17, contact arm 14, and line 24 to line 9. Energization of relay coil 37 will cause contact arms 40 and 41 to move respectively into engagement with contacts 51 and 55. The engagement of arm 40 with contact 51 permits the current to travel directly through line 49 from line 46 to contact arm 40, thereby bypassing the contact arm 45 of mechanism 3. At the same time, a circuit is also established, starting from point 47, through line 48, contact 50, contact arm 45, line 59, line 60, contact arm 12, contact 15, line 21, contact 19, line 28, capacitor 8, line 7, starting winding 6, line 27, contact 18, line 22, contact 16, contact arm 13, and line 23 to line 9. It will be observed that both the low speed main winding 4, and the starting winding 6 connected in parallel therewith and axially displaced therefrom, are energized. Consequently, rotor 2 of motor 1 will start to rotate. At a predetermined speed of rotation, mechanism 3 will move contact arm 45 down out of engagement with contacts 52 and 50, and into engagement with contact 53. The circuit through main winding 4 will continue to be completed since, as explained, contact arm 45 is no longer needed to complete the main winding circuit after the energization of relay coil 37. Starting winding 6, however, will be disconnected since it was necessary for the circuit to be completed through the contact arm 45 between contacts 52 and 50. The motor will thus continue to run on low speed main winding 4 alone.

When it is desired to reverse the direction of rotation of rotor 2, switch 11 is thrown to the right so that contact arms 12, 13, and 14 engage respectively contacts 18, 19, and 20. The disengagement of contact arm 14 with contact 17 will open the circuit through which energization of relay coil 37 is completed and, therefore, contact arms 40 and 41 are moved into the positions shown in Figure 1, that is, contact arm 40 is in engagement with contact 56 and contact arm 41 is out of engagement. The movement of contact arm 40 will complete a regenerative braking circuit which includes main winding 4, starting winding 6, and capacitor 8, and which is as follows: starting with contact 56, the regenerative braking circuit is completed through contact arm 40, line 61, winding 4, line 62, line 66, contact 20, contact arm 14, line 24, line 23, contact arm 13, contact 19, line 28, capacitor 8, line 7, winding 6, line 27, contact 18, contact arm 12, line 60, and line 57 back to contact 56. This arrangement provides for braking until the predetermined cut-in speed is reached at which point contact arm 45 returns to the position shown, in engagement with contacts 50 and 52 so as to complete a starting circuit through starting winding 6. It will be observed that, because of the interconnection of contacts 15 and 19 by line 21 and of the interconnection of contacts 16 and 18 by line 22, the connections to the starting winding 6 are exactly opposite when contact arms 12 and 13 are connected to contacts 18 and 19 from when the two contact arms are connected respectively to contacts 15 and 16. The phase displacement caused by capacitor 8 will then cause a rapid plugging action and the motor 1 will start to rotate in the opposite direction.

When high speed operation is desired, contact arm 29 is moved from contact 31 to contact 30. If, by chance, the change in speed should be desired during operation of the motor 1, a circuit will immediately be completed through the appropriate main winding and the other main winding will be disconnected in the same operation without further complications. When high speed operation is desired and the motor is at a standstill, a circuit will be completed, starting from contact 30, through line 32, relay coil 33, line 43, contact arm 45, contact 52, line 59, line 57, contact 56, contact arm 40, line 61, winding 4, line 62, line 66, contact 20, contact arm 14, and line 24 to line 9. The completion of this circuit causes energization of coil 33 and contact arms 40 and 41 are respectively moved into engagement with contacts 51 and 55. A circuit is also completed, starting from point 44, through contact arm 45, contact 52, line 59, line 60, contact arm 12, contact 18, line 27, winding 6, line 7, capacitor 8, line 28, contact 19, contact arm 13, and line 23 to line 9. Motor 1 will thus start to rotate in the same manner as for the low speed operation. When the cut-out speed is reached, contact arm 45 will move out of engagement with contacts 50 and 52 and into engagement with contact 53. Since contact 52 was necessary for the circuits to be completed through windings 6 and 4 respectively, these windings will be de-energized. However, the engagement of contact arm 45 with contact 53 will cause completion of a circuit, starting at contact 53, as follows: through line 54, contact 55, contact arm 41, line 64, high speed main winding 5, line 65, line 66, contact 20, contact arm 14, and line 24 to line 9. The motor speed will thus increase to the point determined by the construction of high-speed main winding 5.

If now it is desired to reverse the direction of rotation of the motor 1, switch 11 is moved out of engagement with contacts 18, 19, and 20 and into engagement with contacts 15, 16, and 17. As was the case before, this will cause de-energization of a relay coil 33 and, therefore, contact arm 40 again moves into connecting relationship with contact 56. This will then establish a regenerative braking circuit which, starting at contact 56, is completed through contact arm 40, line 61, winding 4, line 62, line 66, contact 20, line 26, contact 17, contact arm 14, line 24, line 23, contact arm 13, contact 16, line 22, contact 18, line 27, starting winding 6, line 7, capacitor 8, line 28, contact 19, line 21, contact 15, contact arm 12, line 60, and line 57 back to contact 56. This connection will effect a braking action until the speed has decreased to a point where contact arm 45 moves back into engagement with contacts 50 and 52. As before, this circuit is completed through the internal connections of switch 11 which also is effective to reverse the starting winding connections. The motor will thus be rapidly reversed and will come up to speed in the opposite direction. Again, at the predetermined speed level, contact arm 45 will move out of engagement with contacts 50 and 52 and into engagement with contact 53 to re-establish the high speed main winding circuit.

The examples of operation of the motor have been selected so as to show that a regenerative braking circuit is obtained whichever speed be selected and whichever the direction of rotation of the motor at the time that reversal is desired.

Referring now to Figure 2, there is shown a second embodiment of the invention which will be explained using like numerals for like parts. Line 10, instead of terminating in switch arm 29 as in Figure 1, is joined to coil 67 of a relay 68 having a core 69. Energization of relay coil 67 effects movement of contact arms 40 and 41 in the same manner that energization of either coil 33 or 37 effected movement of the contact arms in the embodiment of Figure 1.

Coil 67 is joined by a line 70 to a contact arm 71 engageable with either of two contacts 72 and 73. Contact 73 is joined through a line 74 to point 44 in the same manner as line 43 was joined to point 44 in the embodiment of Figure 1. Contact 72 is connected by a line 75 to point 47 in the same manner that line 46 was connected to point 47 in the embodiment of Figure 1. The operation of the motor is the same for both embodiments, with the selection of speed being determined by the position of contact arm 71 in the embodiment of Figure 2. When the contact arm 71 is in the position shown, engaging contact 72, the motor is connected for low speed operation in precisely the same manner as was effected through the engagement of contact arm 29 with contact 31 in the embodiment of Figure 1. High speed operation in Figure 2 is achieved by engagement of contact arm 71 with contact 73 in the same manner that, in the embodiment of Figure 1, high speed operation was achieved by engagement of contact arm 29 with contact 30. In all other respects the operation of the embodiment of Figure 2 is precisely the same as that of Figure 1. It will be observed that a single relay 68 performs the function of the two relays 34 and 38 in the embodiment of Figure 1. The structure set forth in Figure 2 is particularly desirable for those applications where it is desired to sell the motor without the relay structure connected therein.

It will be seen from the foregoing that this invention provides two embodiments of a motor circuit for an improved two speed rapidly reversing motor.

It will, of course, be understood that, while the invention has been explained by describing a low-speed starting arrangement, it is possible to reverse the positions of the windings 4 and 5 and to modify the physical structure (not shown) of winding 6 so as to effect starting on the high speed winding. Such an arrangement would have the advantage that the motor would come up to speed more rapidly. However, the structure illustrated has the advantageous feature that the braking action obtained is more positive because of the known phenomenon that the regenerative braking effect decreases as the speed departs from full running speed. Therefore, while this invention has been explained by describing particular embodiments thereof, it will be apparent that improvements and modifications may be made without departing from the scope of the invention as defined in the appended claims.

What I claim as new and desire to secure by Letters Patent of the United States is:

1. A multispeed, reversing, self-starting alternating current single phase motor comprising a plurality of alternatively selectable main windings each arranged to provide a particular running speed, a starting winding axially displaced from one of said main windings and in parallel therewith, phase displacing means in series with said starting winding, said motor being connected to start on said one main winding and said starting winding, speed responsive switch means arranged to disconnect said starting winding at a predetermined speed of rotation of said motor, said motor being connected to run on the selected one of said main windings thereafter, switch means for reversing the connections of said starting winding for rotation of said motor in the opposite direction, relay means connected to be energized during starting and running of said motor, said relay means being arranged to be de-energized upon operation of said reversing switch means from one operative position to another so long as said motor rotates above said predetermined speed, said one main winding and said starting winding being connected by said relay means in a regenerative braking circuit and the remainder of said main windings being connected by said relay means until said speed responsive switch means operates to reconnect said starting winding whereby said motor rapidly reverses its direction of rotation.

2. A two-speed reversing self-starting alternating current single phase motor comprising alternatively selectable high speed and low speed main windings, a starting winding axially displaced from one of said main windings and in parallel therewith, phase displacing means in series with said starting winding, said motor being connected to start on said one main winding and said starting winding, speed responsive switch means arranged to disconnect said starting winding at a predetermined speed of rotation of said motor, said motor being connected to run on the selected one of said main windings thereafter, switch means for reversing the connections of said starting winding for rotation of said motor in the opposite direction, a pair of contact means respectively in series with said one main winding and with the other of said main windings and arranged to be maintained in a predetermined position in response to energization of any of said windings, said one main winding and said starting winding being connected in a regenerative braking circuit by said first contact means when none of said windings is energized and said reversing switch means is closed and said motor is operating above said predetermined speed until said speed responsive switch means operates to reconnect said starting winding whereby said motor rapidly reverses its direction of rotation, said second contact means being arranged upon selection of said other main winding to cooperate with said speed responsive switch means above said predetermined speed to connect said other main winding for energization, said other main winding being maintained disconnected above said predetermined speed by said second contact means upon operation of said reversing switch means until said speed responsive switch means operates.

3. A two-speed reversing self-starting alternating current single phase motor comprising alternatively selectable high speed and low speed main windings, a starting winding axially displaced from said low speed main winding and in parallel therewith, phase displacing means in series with said starting winding, said motor being connected to start on said low speed main winding and said starting winding, speed responsive switch means arranged to disconnect said starting winding at a predetermined speed of rotation of said motor, said motor being connected to run on the selected one of said main windings thereafter, switch means for reversing the connections of said starting winding for rotation of said motor in the opposite direction, a pair of contact means respectively in series with said low speed main winding and said high speed main winding, a relay coil in series with all said windings operatively connected to said pair of contact means so as to maintain the same in a predetermined closed position in response to energization of any of said windings, said relay coil being operative when none of said windings is energized and said reversing switch means is closed and said motor is operating above said predetermined speed to cause one of said pair of contact means to connect said low speed main winding and said starting winding in a regenerative braking circuit until said speed responsive switch means operates to reconnect said starting winding whereby said motor rapidly reverses its direction of rotation, the second of said pair of contact means being arranged upon selection of said high speed main winding to cooperate with said speed responsive switch means above said predetermined speed to connect said high speed main winding for energization, said relay coil further being operative when none of said windings is energized and said motor is operating above said predetermined speed to cause said second contact means to maintain said other main winding disconnected until said speed responsive switch means operates.

4. A two-speed reversing self-starting alternating current single phase motor comprising alternatively selectable high speed and low speed main winding, a starting winding axially displaced from said low speed main winding and in parallel therewith, phase displacing means in series with said starting winding, said motor being connected to start on said low speed main winding and said starting winding, speed responsive switch means arranged to disconnect said starting winding at a predetermined speed of rotation of said motor, said motor being connected to run on the selected one of said main windings thereafter, switch means for reversing the connections of said starting winding for rotation of said motor in the opposite direction, a pair of contact means respectively in series with said low speed main winding and said high speed main winding, a pair of relay coils arranged to be alternatively energizable with said alternatively selectable main windings respectively so that one of said coils is energized when any of said windings is energized, each of said coils being arranged to control said pair of contact means so as to maintain the same in a predetermined closed position in response to energization of any of said windings, said coils being operative when none of said windings is energized and said reversing switch means is closed and said motor is operating above said predetermined speed to cause one of said contact means to connect said low speed main winding and said starting winding in a regenerative braking circuit until said speed responsive switch means operates to reconnect said starting winding for energization whereby said motor rapidly reverses its direction of rotation, the second of said pair of contact means being arranged upon selection of said high speed main winding to cooperate with said speed responsive switch means above said predetermined speed to connect said other main winding for energization, said relay coils further being operative when none of said windings is energized and said motor is operating above said predetermined speed to maintain said second contact means disconnected until said speed responsive means operates.

References Cited in the file of this patent

UNITED STATES PATENTS

| | | |
|---|---|---|
| 1,961,793 | Schaefer | June 5, 1934 |
| 2,069,077 | Michelson | Jan. 26, 1937 |
| 2,380,270 | Suhr et al. | July 10, 1945 |
| 2,407,117 | Warner | Sept. 3, 1946 |
| 2,647,230 | Reek | July 28, 1953 |
| 2,651,747 | Warner | Sept. 8, 1953 |
| 2,689,933 | Vienott | Sept. 21, 1954 |